Oct. 24, 1967 — R. M. MAYES — 3,348,433

TAPPING ASSEMBLY

Filed Jan. 4, 1965

Oct. 24, 1967    R. M. MAYES    3,348,433
TAPPING ASSEMBLY
Filed Jan. 4, 1965    3 Sheets-Sheet 2
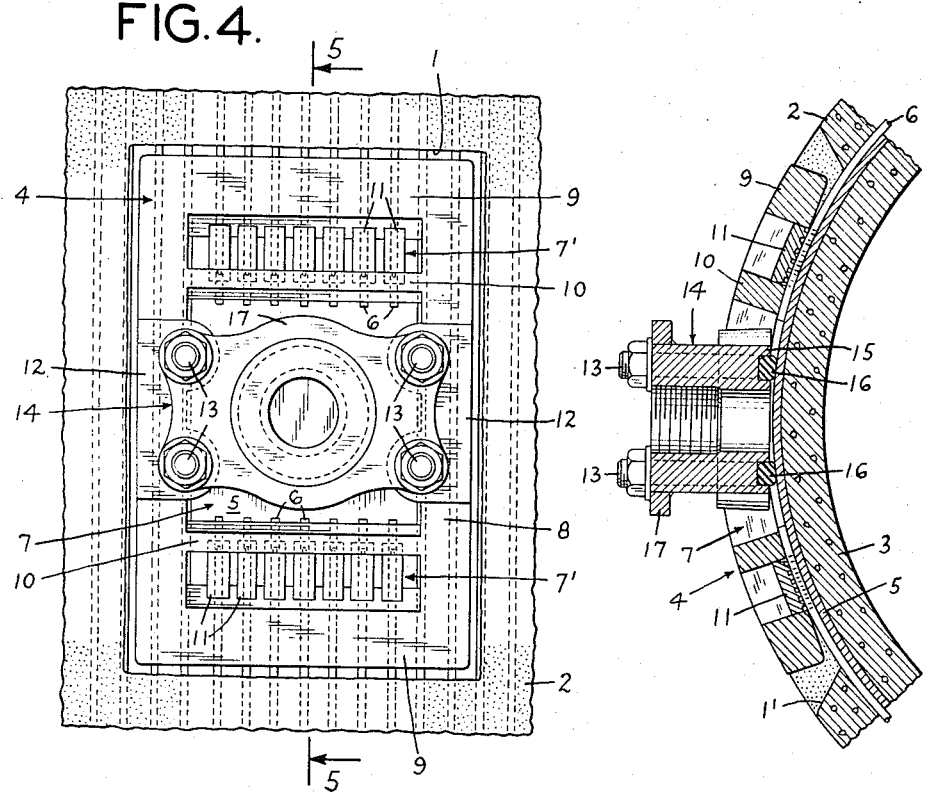
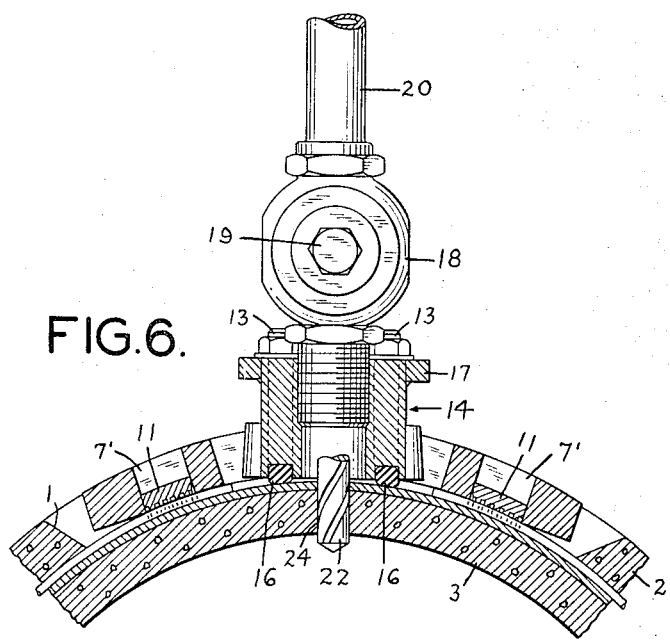

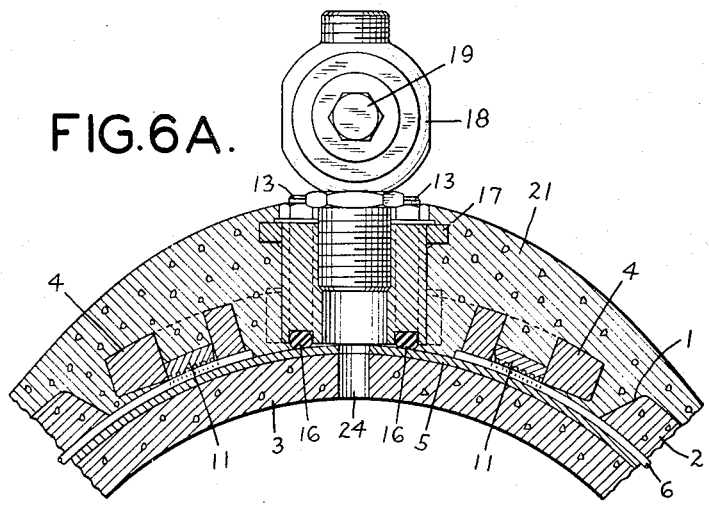
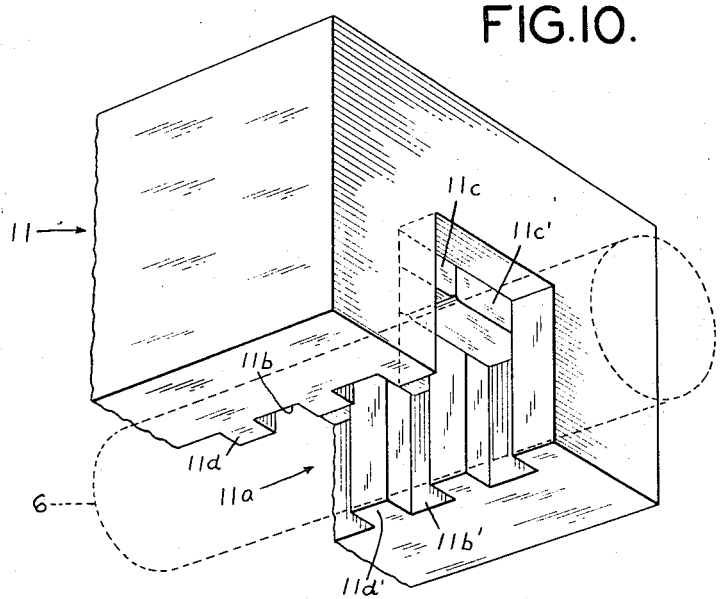

United States Patent Office 3,348,433
Patented Oct. 24, 1967

3,348,433
TAPPING ASSEMBLY
Robert M. Mayes, Hazlet, N.J., assignor to International Pipe & Ceramics Corporation, East Orange, N.J., a corporation of Delaware
Filed Jan. 4, 1965, Ser. No. 423,273
4 Claims. (Cl. 77—42)

ABSTRACT OF THE DISCLOSURE

A support means with a tapping machine for tapping a concrete pipe prestressed with high tensile strength wire. The support contains walled recesses for receiving notched wire anchor blocks. The walled recesses have a wedging means for firmly securing the notched wire anchor blocks.

This invention relates to an apparatus for tapping pipes under internal hydrostatic pressure.

The invention is adaptable for tapping metallic or other forms of pipes circumferentially wrapped with wire, and is particularly well suited for drilling through the core of a prestressed concrete pipe which is under pressure. Such pipes have had wide application. They are suitable for water transmission lines, trunk distribution mains and sewer force mains, since the pipes are satisfactory for the range of pressures normally encountered in water works and sewerage practice. The pipes are equally applicable for pump and gravity lines.

Prestressed concrete pipes can consist of a continuous arc-welded steel cylinder with steel joint rings welded to the ends of the cylinder. The steel cylinder has an inside lining of concrete, is circumferentially wrapped with a high tensile strength wire under tension and is coated with a dense covering of cement mortar or concrete. Such pipes can be further constructed with a self-centering expansion joint sealed with a rubber gasket and thus making them capable of taking care of any normal movement due to earth settlement and extremes of temperature.

Alternatively, the prestressed concrete pipes can omit the steel cylinder and consist of a concrete core manufactured by a centrifugal, vertical casing, or other suitable process, both longitudinally and circumferentially prestressed by high tensile strength wire, and further protected by a dense coating of premixed cement mortar or concrete. As with the above type, the pipes can be provided with a self-centering flexible joint, sealed with a rubber gasket which compensates for normal movement due to earth settlement and temperature changes. Exemplary of such a joint is a self-centering polyvinyl chloride coated steel joint ring with preformed round ruber gaskets so designed that the joint will be watertight under all conditions of service.

Heretofore, such methods for tapping prestressed concrete pipes under internal hydrostatic pressure have generally comprised chipping away a section of the exterior mortar coating of the pipe to expose the circumferential high tensile strength wire of the pipe and subsequently installing a saddle member over the chipped opening, the saddle member having both an outside wall portion adapted to rest firmly against the surface of the pipe and a center opening or recess to frame an area of the exposed high tensile wire of the pipe. Alternatively, instead of first chipping away the exterior mortar coating of the pipe to form an opening, the saddle member can be initially attached to the pipe exterior and a portion of the outside coating of the pipe exposed in the opening of the saddle member removed thus revealing an area of the high tensile wire of the pipe. The saddle member is usually provided with one or more ports through which cement mortar grout can be introduced to any space between the pipe and saddle member.

After the saddle member has been secured against the exterior surface of the pipe with U-shaped bands that stretch over the entire periphery of the pipe and a portion of the exterior mortar coating of the pipe removed, the high tensile strength wire of the pipe that is exposed through an opening in the saddle member is cut away and a tubular gland fitted within said opening and compressed against the exposed surface of the pipe with the aid of a sealing means, e.g. a gasket, to make a watertight seal. Thereupon the gland is mounted with a suitable means for collecting drilling dust and for attaching a drilling machine, e.g. a corporation stop. The drilling machine can be inserted through, and attached to, the tubular gland via the corporation stop, the corporation stop containing a valve which can be closed after the hole has been drilled and the drill retracted, thus allowing the drilling machine to be subsequently replaced and an outlet connection conventionally installed without interrupting the normal operation of the pipeline. The actual drilling is then carried out, it being advantageous at times to dam the perimeter of the saddle member and also to protect the saddle member with a concrete encasement.

In the aforementioned method for tapping pipe a prime difficulty has been encountered owing to the fact that excavation of earth below the springline of the pipe is necessary to secure the saddle member against the exterior surface of the pipe by means of the U-shaped bands. Such excavation is time consuming and naturally increases the tapping assembly and installation costs. Attempts in the past to circumvent this difficulty have largely proved unsuccessful.

An object of the present invention is to provide a novel apparatus for tapping a pipe without the necessity of any excavation of the earth below the springline of the pipe.

Another object of the invention is to provide a tapping assembly which can be anchored firmly to the pipe in an easy and simple manner.

A further object of the invention is to obviate the need for the U-shaped bands customarily employed for attaching the saddle member to the exterior surface of the pipe.

Another object of the invention is to reduce the time for tapping a pipe as well as the tapping assembly and installation costs.

Other objects and advantages of the invention will be apparent to those skilled in the art from the specification taken in conjunction with the appended drawings.

It has been found that the foregoing objectives can be accomplished by employing a support or saddle means for the drilling or tapping machine which includes a means for supporting the tapping machine, and means for engaging or gripping a section of the exposed high tensile strength wire of the pipe. Advantageously, the engaging means comprises at least one wire anchor bar of solid material, e.g. metal, having a cavity extending inwardly into the bar, the sides of the cavity having notches of any geometrical shape for gripping the high tensile strength wire of the pipe. The notched wire anchor bars are driven onto the wire of the pipe in walled recesses of the support means and held in said recesses, the anchor bars being firmly wedged between the walls of the recesses. If desired the recess walls themselves which allow for a wedging action may be provided with additional wedging means, e.g. fins extending from said walls, for holding secure the wire anchor bars in said recesses.

The invention will be better understood by reference to the features hereinafter fully described and particularly pointed out in the claims, the following description and the annexed drawings setting forth in detail a certain illustrative embodiment of the invention. This embodiment, however, is merely indicative of but one way in which the principle of the invention may be employed. It is to be understood that the illustrative embodiment is not intended to confine the invention to this one form of embodiment for the invention is susceptible of embodiment in various forms all coming within the scope of the claims which follow.

In said annexed drawings:

FIG. 4 illustrates a support means for the tapping machine in place on a cylindrical pipe to be cut with tubular gland mounted on said support means;

FIG. 5 is a cross-sectional view taken along line 5—5 of FIG. 4 in the direction of the arrows;

FIG. 6 shows the support means, tubular gland, a corporation stop and portion of drill in place;

FIG. 6A is a figure similar to FIG. 6 and shows the support means, tubular gland, and corporation stop in place, the support means and tubular gland having a protective coating of cement mortar grout;

FIG. 10 is a fragmentary view in perspective of one of the notched wire anchor bars.

Figure 1:
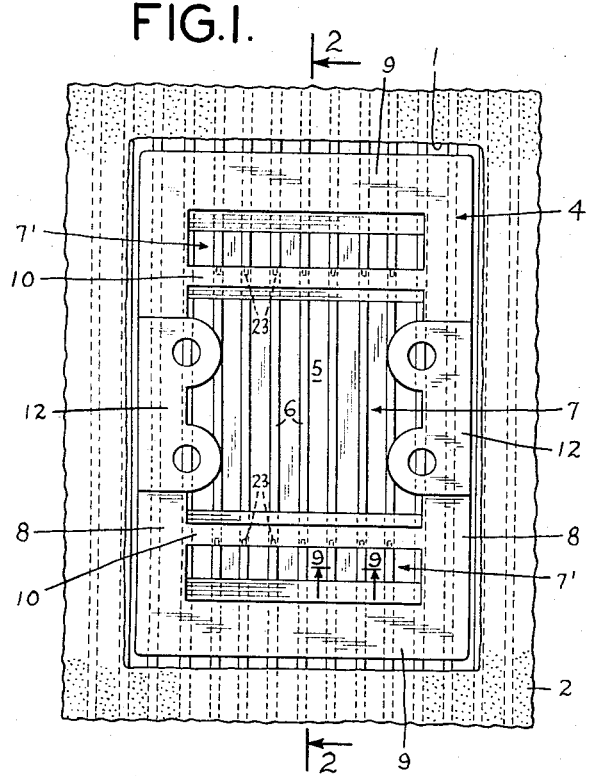
FIG. 1 shows a support means for the tapping machine in place on a cylindrical pipe to be cut.
Figure 2:
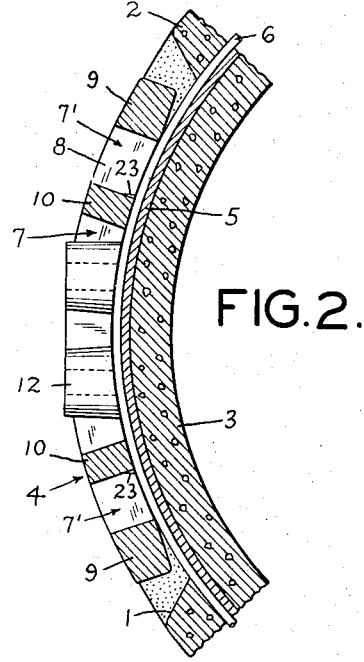
FIG. 2 is a cross-sectional view taken along line 2—2 of FIGURE 1, in the direction of the arrows.
Figure 3:
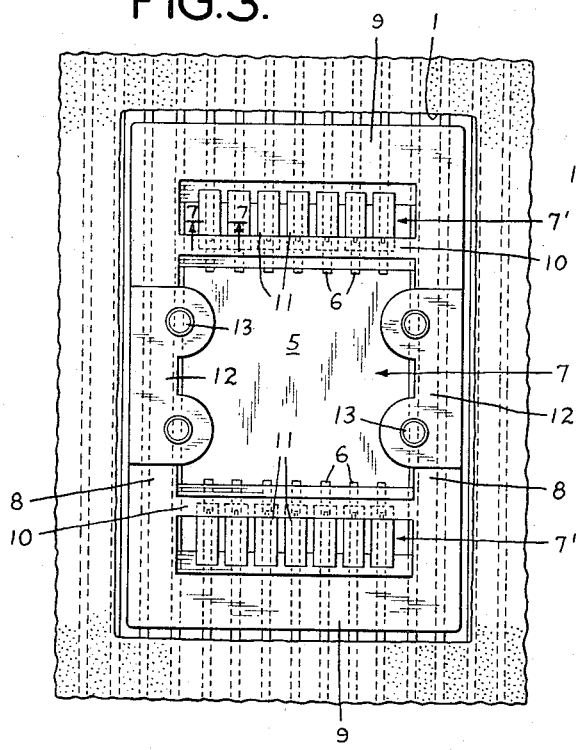
FIG. 3 shows the support means for the tapping machine in place on a cylindrical pipe to be cut as in FIG. 1 but with the high tensile strength wire of the pipe that was exposed in the central opening or recess of the support means removed and with the notched wire anchor blocks in place in the support means.
Figures 7, 9:
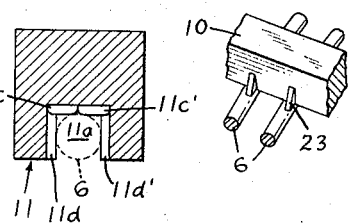
FIG. 7 is a cross-sectional view taken along line 7—7 of FIG. 3 and FIG. 8 in the direction of the arrows.
FIG. 9 is a cross-sectional view taken along line 9—9 of FIG. 1 in the direction of the arrows.
Figure 8:
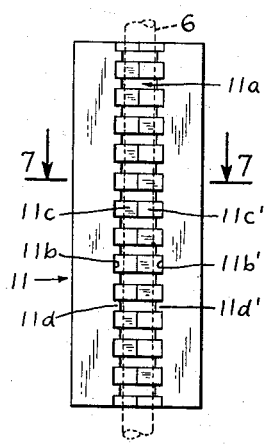
FIG. 8 is a view from the bottom looking into the notched sided cavity of the wire anchor bar.

Referring to FIGS. 1 through 10 of the drawings, a hole 1 is cut through the outside mortar covering material 2 of the pipe by removing a section thereof having a shape corresponding substantially to the shape of the saddle member or support means 4. This covering material may be removed by workmen using hand tools or a chipping machine. All the material is removed down to the steel cylinder 5 of the pipe thus exposing a portion of the circumferentially wrapped high tensile strength wire 6 of the pipe. The inside concrete lining of the pipe is at 3. Alternatively the pipe may comprise, in place of the steel cylinder, merely the concrete cores circumferentially prestressed with the high tensile strength wire. Saddle member or support means 4 is then mounted so as to rest on the exposed high tensile strength wire of the pipe in said hole as shown in FIG. 1. Saddle member 4 which may be made, as a one piece cast anchor frame, has side walls 8, end walls 9 and intermediate walls 10. A centrl recess 7 is defined by walls 10 and 8 while side recesses 7' are defined by walls 8, 9, 10. The bottoms of said wall portions have a concave curvature which corresponds substantially to the curvature of the outside circumference of the pipe.

Notched wire anchor bars 11 are then driven onto the exposed high tensile strength wire and held in side recesses 7' as shown in FIG. 5. Fins 23 on wall 10 of side recesses 7' help in jamming the anchor bar in place. The saddle member provides compensatory reinforcing to the main pipe for loss in strength occasioned when its regular reinforcing is cut.

FIG. 10 shows a portion of a typical notched wire anchor bar of case hardened steel employed in the invention. The wire anchor bar has a longitudinal channel shape portion 11a, the open end of the channel being at its lower portion. A multiplicity of vertical grooves 11b is at one side and similar opposing vertical mirror imaged grooves 11b' at the other side. A multiplicity of substantially flat ridges 11c and 11c' are located on the inside roof portion of the channel, said ridges being formed from the case hardened steel and punched out (a broaching) while forming said grooves 11b and 11b'. A multiplicity of ridges 11d are located at one side of the channel and similar opposing vertical mirror imaged ridges 11d' are located at the other side, said ridges being located between grooves 11b and 11b' respectively. The high tenslie strength wire of the pipe is held firmly against ridges 11c and 11c', grooves 11b and 11b' and ridges 11d and 11d', the notched wire anchor bars in turn securing the saddle member to the pipe.

After the wire anchor bars are in place, the high tensile strength wires in the central rectangular recess 7 in the support frame are cut and removed leaving an intervening space between the cut ends greater than the outside diameter of gland 14. Studs 13 are then screwed into tapped holes in flat flanges 12 of walls 8.

The tubular gland 14 is provided with a grooved ring member 15 at its inner edge in which a sealing means, such as an O-ring gasket 16 or other packing means is fitted. The gland carries at its remote or other end a flange 17 which is disposed parallel to flanges 12 of walls 8 of the support means. Flange 17 has drilled and tapped holes which allows the gland to be fitted by means of studs 13 into recess 7 and to be tightened down onto the steel cylinder 5 of the pipe to yield the structures shown in FIGURES 4 and 5. When the gland 14 is compressed against the steel cylinder of the pipe in recess 7, the gasket 16 provides a seal against any leakage betwen the pipe and the grooved ring member 15. The gasket is made of any kind of compressible or pliable material which is ordinarily used for sealing purposes, such as rubber asbestos, fiber-filled lead gaskets, etc. A corporation stop 18 with valve 19 is then screwed into the tubular gland and a commercially available tapping or drilling machine 20 threaded into the stop. If desired a thread nut may be threaded into the gland and the corporation stop in turn screwed into the thread nut. An adapter nipple may then be attached to the corporation stop and a drilling machine thereupon inserted through the adapter nipple. All connections are then tested for water-tightness.

After the assembly has been assembled, a hole 24 is drilled through the remaining wall of the pipe. FIG. 6 shows a completed hole having been made by the drill, a portion of the drill shown at 22. After the drilling is complete, the drill stem is withdrawn from the hole, the corporation stop closed via valve 19 of the stop and the drilling machine with its adapter preferably removed. Thereafter a mortar mix 21 is packed in and around the support frame 4 and tubular gland 14 as shown in FIG. 6A. The mortar mix acts as a protective coating against corrosion and the like for the whole assembly. If desired, a portion of the mortar may be used to fill up the voids in the support means, a wire mesh then placed over the support means and the remaining mortar added to completely cover the wire mesh, the wire mesh itself acting to reinforce the mortar packing. In another embodiment the mortar mix may be packed in and around the support frame 4 and tubular gland 14 prior to removal of the drilling machine.

An outlet connection such as a copper pipe and the like can then be conventionally attached to the corporation stop via an adapter without interrupting the normal operation of the main pipeline.

It will be understood that the invention may be variously modified and embodied within the scope of the subsequent claims.

What is claimed is:

1. A support means for a tapping machine for use in tapping a concrete pressure pipe prestressed with high tensile strength wire, said support means containing walled recesses for receiving notched wire anchor blocks, means for supporting a tapping machine, and means for gripping a section of the high tensile strength wire exposed in said recesses and securing said support means to the pipe, said gripping means comprising at least one wire anchor bar having a notched cavity for gripping said wire, and said walled recesses having a wedging means for firmly securing the notched wire anchor blocks.

2. A support means for a tapping machine for use in tapping a concrete pressure pipe prestressed with high tensile strength wire, said support means containing walled recesses for receiving notched wire anchor blocks, means for supporting a tapping machine, and means for gripping a section of the high tensile strength wire exposed in said recesses and securing said support means to the pipe, said gripping means comprising at least one wire anchor bar having a notched cavity for gripping said wire, and said walled recesses having a wedging means comprising a plurality of fins extending from the walls of said recesses for firmly securing the notched wire anchor blocks.

3. A tapping assembly for tapping a concrete pipe circumferentially wrapped with high tensile strength wire which comprises in combination a tapping machine and a support means for said tapping machine, said support means containing walled recesses for receiving notched wire anchor blocks, means for supporting the tapping machine, and means for gripping a section of the high tensile strength wire exposed in said recesses and securing said support means to the pipe, said gripping means comprising at least one wire anchor bar having a notched cavity for gripping said wire, and said walled recesses having a wedging means for firmly securing the notched wire anchor blocks.

4. A tapping assembly for tapping a concrete pipe circumferentially wrapped with high tensile strength wire which comprises in combination a tapping machine and a support means for said tapping machine, said support means containing walled recesses for receiving notched wire anchor blocks, means for supporting the tapping machine, and means for gripping a section of the high tensile strength wire exposed in said recesses and securing said support means to the pipe, said gripping means comprising at least one wire anchor bar having a notched cavity for gripping said wire, and said walled recesses having a wedging means comprising a plurality of fins extending from the walls of said recesses for firmly securing the notched wire anchor blocks.

References Cited

UNITED STATES PATENTS

| 2,375,921 | 5/1945 | Hirsh. | |
| 3,275,040 | 9/1966 | Hausmann et al. | 285—189 X |
| 3,315,989 | 4/1967 | Ohnstad | 138—99 X |

CHARLIE T. MOON, *Primary Examiner.*